United States Patent Office  3,142,631
Patented July 28, 1964

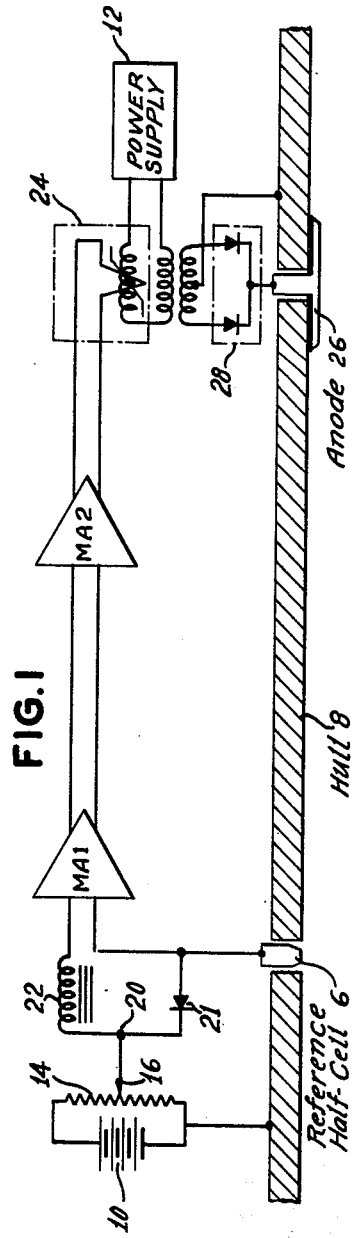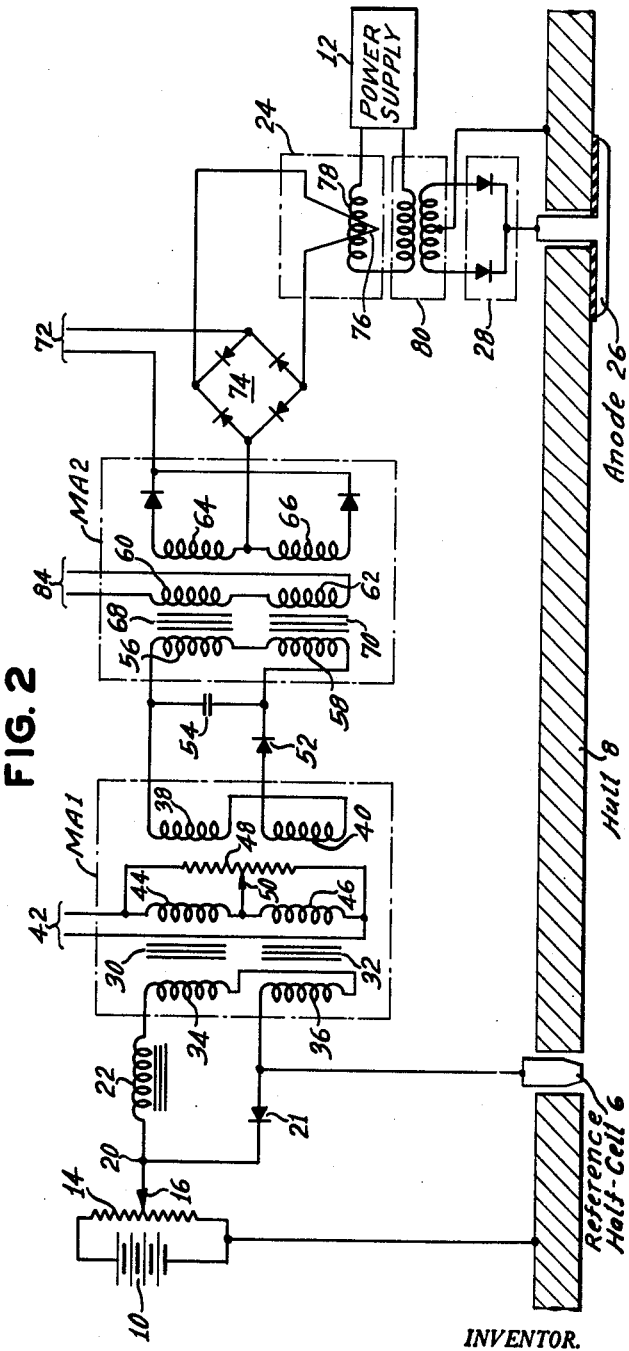

3,142,631
CATHODIC PROTECTION CIRCUIT
George V. Woodley, Quincy, Mass., assignor to Engelhard Industries, Inc., Newark, N.J., a corporation of Delaware
Filed Mar. 7, 1961, Ser. No. 94,043
11 Claims. (Cl. 204—196)

This invention relates to power control systems and, more particularly, to closed loop systems in which optimum conditions are maintained by supplying power of variable level to a load in accordance with a signal representing deviation from optimum conditions.

Systems of the above mentioned type may be used, for example, in conjunction with the power supply to a furnace. In order to maintain the furnace temperature at a predetermined level, considered the optimum condition, a thermoelement may be used for developing a temperature-responsive signal voltage which is applied to the control circuitry to adjust the power supply to the furnace, so that the furnace temperature is maintained substantially constant under otherwise varying conditions.

Among the numerous fields in which such systems are employed, there are specific applications in which only an extremely weak signal can be obtained so that increasing the sensitivity of the system without distorting the response constitutes a problem which is comparatively difficult to overcome. Since, theoretically speaking, all systems exhibit a zero drift, only systems with such a drift within a range which is negligible as compared to the signal have acceptable performance characteristics. Moreover, the time response is in many instances of extreme importance, while, in other cases, a comparatively small lag may be considered permissible.

The present invention is particularly directed to a closed loop system of the type used in cathodically protecting metallic objects in contact with an electrolyte such as a ship's hull, propellers and other components which are constantly exposed to the corroding action of, for example, water.

It is known that the painted surfaces on the hulls of ships, for example, may be preserved against rust and corrosion by the flow of electrical current to the hull surface. This may be accomplished by metallic anodes located on the surface of the hull and insulated therefrom. The level of current must be regulated to provide sufficient protection and yet to avoid the high current levels which tend to damage the paint. As applied to a ship, for example, different levels of current are required at different speeds of the ship. Thus, several times as much current must be provided when the ship is underway than when it is docked. Other facts which determine the required current level include the nature and the electrical resistance of the water in which the painted surface is submerged and its temperature.

In order to detect these changes in cathodic protection conditions, various sensing circuits have been proposed. Up to the present time, the most conventional sensing element for such circuits has been considered to be a silver-silver chloride half-cell submerged in the water and having the surface to be protected i.e. the hull of the ship as the other electrode. The voltage generated by this reference half-cell is about 0.85 volt when proper cathodic protection of the hull is taking place. When the voltage developed by this sensing cell increases or decreases significantly from this value of 0.85 volt, the protective current supplied to the anode or anodes is decreased or increased until the desired optimum condition, represented by the voltage level of 0.85, is restored.

Conventional magnetic amplifiers are widely used, particularly in many electronic systems. However, in the case of cathodic protection systems, the stability of such magnetic amplifiers is insufficient to provide a workable system. Thus, conventional magnetic amplifiers require input signals of the order of $10^{-5}$ watts (10-millionths of a watt), or so, for proper performance. However, if the signals drawn from the reference half-cell exceed a power level of the order of $10^{-8}$ watts, the accuracy of the cell reading is impaired; thus the required input level for a conventional magnetic amplifier of $10^{-5}$ watts, noted above, leads to inferior results. Accordingly, a principal object of the present invention is to stabilize and improve cathodic protection systems employing magnetic amplifiers.

In cathodic protection systems, such as that described in U.S. patent application Serial No. 732,275, filed May 1, 1958, the direct current supplied to the anode or anodes for the cathodic protection of the hull is regulated in accordance with the signals supplied by the reference half-cell. These cells are of known materials, such as silver chloride deposited on metallic silver, or other materials, as mentioned above and described, for example, in U.S. Patent No. 2,934,484.

In the above-mentioned patent application Serial No. 732,275, a cathodic protection system is described which includes an additional source of voltage in circuit opposition with the voltage developed by the reference half-cell. Accordingly, the opposed electromotive force constitutes a reference voltage, and comparing one voltage with the other results in what may conveniently be termed a "differential signal voltage" or "error voltage."

The anode current required to achieve optimum cathodic protection conditions is regulated, in the system of this invention, by the above-mentioned small differential signal voltage. Under optimum cathodic protection conditions, the reference half-cell voltage is not equal to the voltage of the additional source of reference voltage, as it is the case with the system described in copending application Serial No. 732,275. However, by using a highly sensitive magnetic amplifier, this required differential signal voltage is reduced to an acceptable small value. At this value, the current which flows between the reference half-cell and the opposing circuit voltage is of such a small magnitude that the life and operating characteristics of the reference half-cell are not affected. At normal operating conditions, the differential signal is of such polarity that current always flows from the circuit toward the reference half-cell, thus reducing the consumption of the reference cell material, such as silver chloride.

While conventional magnetic amplifiers, although they have been suggested for use in cathodic protection systems, failed to give satisfactory results for the reasons stated above, the principle of using a reference bucking voltage was found a significant improvement in the art of cathodic protection.

Since elimination of moving parts such as relays, motors and the like from systems contemplated herein is considered a desirable step forward, and as magnetic amplifiers are free from such parts, reliable in performance, highly sensitive and as they exhibit considerable power gain, it is one of the more important objects of the present invention to adapt the magnetic amplifier principle to the highly specific requirements in cathodic protection.

It has been found that, when combining the concept of a differential signal voltage, as disclosed in the above-mentioned patent application Serial No. 732,275, with a definite type of magnetic amplifier, a closed loop system is obtained which fulfills the requirements in cathodic protection to the extent that a workable system is obtained. Consequently, and inasmuch as a bucking reference voltage is used, the present invention constitutes a further development of the system described in application Serial No. 732,275.

In accordance with the present invention, the foregoing objects are achieved through the use of a second-harmonic magnetic amplifier which receives signals from the reference half-cell of the cathodic protection system and controls the level of current applied to the anodes of the system. Preferably, an opposing or bucking reference voltage is employed for adjusting the reference half-cell voltage in such a manner, that the polarity of the resulting differential signal indicates overprotection conditions or underprotection conditions. In one embodiment, the second-harmonic magnetic amplifier served as a pre-amplifier, a conventional magnetic amplifier raised the input signal level further, and a saturable reactor was employed to regulate the direct current applied to the anodes of the cathodic protection system.

The system described above has the advantages of employing entirely magnetic type control circuits which are much less sensitive to vibration, radiation, or other factors which tend to cause failures in vacuum tube or transistor circuits. Furthermore, the system is a significant improvement over arrangements in which moving contacts are employed, as such systems are subject to failure through contact failure, vibration, and the like. In addition, as contrasted with the use of conventional magnetic amplifiers, the use of a second-harmonic type magnetic amplifier provides the necessary sensitivity to low level input signals. While a second-harmonic system is frequently considered objectionable because of its low response time, this is not an objection in large cathodic protection systems where overall response times are generally long.

In accordance with another important feature of the invention, and as set forth above, the signal supplied to the control windings of the second-harmonic magnetic amplifier is preferably a differential voltage of which both the magnitude and the polarity are indicative of cathodic protection conditions, while, under normal operating conditions, a differential signal of only one polarity is used and the magnitude of that signal determines the amount of current supplied to a load. While conventional magnetic amplifiers do not satisfy the requirements in cathodic protection systems, especially with respect to sensitivity, as expressed by the signal-to-drift ratio, and therefore have not been used in practice for this specific purpose, the second-harmonic magnetic amplifier has been found an especially suitable component when coupled with the polarity-magnitude sensing arrangement resulting from the combination of a reference half-cell with a bucking voltage source.

Other objects, features and advantages of the invention will become apparent from the following detailed description and from the accompanying drawings in which:

FIGURE 1 is a schematic block diagram of a cathodic protection system according to the invention;

FIGURE 2 is a more detailed diagram of the system of FIGURE 1;

Figure 3:
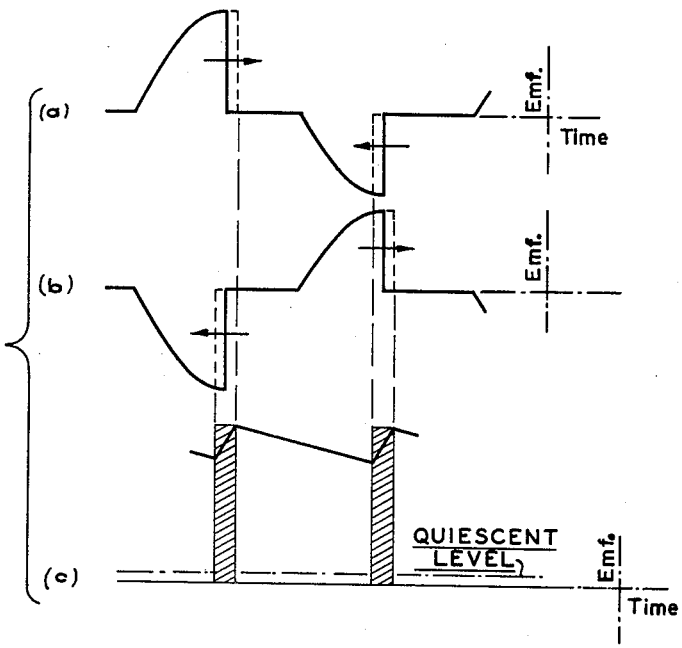
Figure 4:
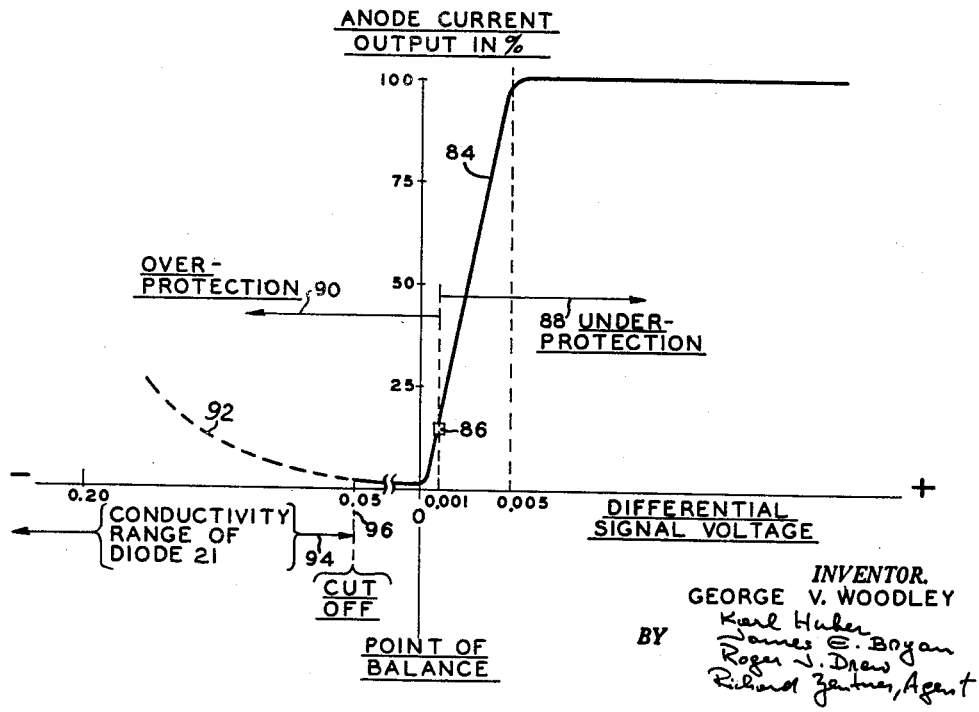

FIGURE 3 graphically illustrates the voltage form appearing in the output windings of a second-harmonic magnetic amplifier, and FIGURE 4 is a graphical illustration of the characteristic of the system of FIGURES 1 and 2.

Referring now to FIGURE 1, a cathodic protection system according to this invention includes a sensing circuit for developing a differential signal. It will be noted that the term "differential signal" is used, in accordance with the foregoing, to define a voltage of which the magnitude and polarity indicate whether overprotection conditions prevail or whether more protective current is required.

The differential signal, obtained as described above as the difference between two voltages or by comparing one with the other, is applied to the control windings of the second-harmonic magnetic amplifier MA1, which constitutes the first stage of the system. The output of the first stage is further amplified, preferably by means of a conventional magnetic amplifier MA2.

The output of MA2, in turn, controls a saturable reactor 24, and the latter determines the current drawn from the power supply 12. This adjusted current is then rectified and applied to the anode or anodes 26 and the hull 8, thereby forming the protective current.

The sensing circuit referred to in the foregoing paragraph includes a reference half-cell 6 mounted through the hull 8 of a ship. By way of example, a mounting assembly enclosing a silver-silver chloride electrode, as described in the above-mentioned U.S. Patent No. 2,934,484, may be used. Such reference half-cell is mounted in the painted steel hull 8, and is known to develop a signal of about 0.85 volt at optimum conditions. This means that, when the potential between the hull and the reference half-cell has a value of 0.85 volt, the protective current has assumed the optimum value at the actually prevailing conditions, sufficient for protecting the hull against corrosion without being excessive, so that the paint film on the hull is not attacked by the decomposition products of the water.

In order to obtain the differential signal, and as described in the above-mentioned copending application Serial No. 732,275, filed May 1, 1958, an opposing or bucking voltage is used and, for the sake of simplification, the source of voltage is illustrated by the symbol 10 of a battery. In practice, all of the circuits in a cathodic protection system of the type contemplated herein are suitably energized from a power supply 12 on board the ship, and the opposing voltage is conveniently derived from a voltage divider, of which the voltage drop is maintained constant by means of a Zener diode. Since providing a constant voltage from a power network is well known in the art, there is no need for describing it in detail.

The opposing or bucking voltage source 10 produces a voltage drop across a potentiometer 14, and, assuming that a silver-silver chloride cell 6 is used, the contact arm 16 of the potentiometer is set at a point so that a voltage of 0.85 volt with respect to the hull 8 appears at the junction 20. The sensing circuit includes furthermore a high reactance coil 22 having, however, a low ohmic resistance, in order to prevent any induced current from flowing through the reference half-cell, since such current would tend to polarize the cell and impair its performance; also the gain of the system would be decreased.

It can be seen from the foregoing that, when the reference half-cell 6 develops a potential of 0.85 volt with respect to the hull 8, no current will be supplied to the control windings of the second-harmonic magnetic amplifier MA1, because the junction 20 is maintained at the same potential. However, when the reference half-cell potential exceeds the mentioned value, current will flow in one direction, while, with the reference half-cell potential below this value, current will flow in the opposite direction. Consequently, the polarity of the differential current essentially indicates either overprotection or underprotection. However, under normal operating conditions, the differential current of only one signal polarity is used, and its magnitude, which is indicative of cathodic protection requirements, is employed for controlling the anode or output current. A more detailed description of the relationship between polarity and magnitude of the signal with respect to the anode current will be found below and in connection with the discussion of FIGURE 4.

The rectifier 21 serves to shunt the differential current of the polarity indicative of overprotection, so as to limit the range of response in order to prevent undesired output in the case of a signal resulting from excessive overprotection. The performance of rectifier 21 will be more clearly understood from FIGURE 4 and the corresponding passage below referring to the characteristic of the system.

It should be noted that, in the foregoing, reference has been made to a silver-silver chloride electrode. While this type of reference electrode develops 0.85 volt with respect to painted sheel hulls at the optimum level of cathodic protection, other reference electrode materials exhibit a different behavoir with respect to polarities and regarding the voltage at optimum conditions. Generally speaking, polarities and magnitudes may be different from those produced by silver-silver chloride electrodes. However, the principle of producing a differential signal may obviously be applied to any selected reference half-cell.

The differential signal appearing in the sensing circuit shown on the left hand side of FIGURE 1, and as described above, is applied to the control windings of the first stage MA1, subsequently further amplified by the second stage MA2 and finally used for driving the saturable reactor 24 in order to adjust the level of current supplied from the power supply 12 to the anode 26 through the output rectifier 28.

Referring in the following to FIGURE 2 of the drawing, it will be seen that the sensing circuit shown in this figure is identical with that of FIGURE 1. Same reference numerals refer to identical circuit components. A second-harmonic magnetic amplifier includes generally a pair of matched cores 30 and 32. The term "matched cores" is intended to indicate that they exhibit magnetic properties as closely identical with each other as possible. The importance of this feature will become more important from the following description in conjunction with FIGURE 3 of the drawing. The control windings 34 and 36 are connected in circuit opposition with respect to each other, and the same is true for the output windings 38 and 40. It should be noted that, in contrast with ordinary magnetic amplifiers, the output circuit which comprises windings 38 and 40, does not include a voltage source. In fact, the second-harmonic magnetic amplifier is driven by the power supplied through a pair of terminals 42 energizing power input coils 44 and 46. Terminals 42 are connected to the power supply available on the ship and, for the sake of simplification, this portion of the complete circuit has been omitted, as mentioned above with respect to the source of bucking voltage 10.

It will be apparent from the foregoing that output current appears in the windings 38 and 40 by induction only and this fact, and the fact that the control windings 34 and 36, and the output windings 38 and 40 are wound in circuit opposition may be considered essential features of a second-harmonic magnetic amplifier. It can be shown, and it will be described with respect to FIGURE 3, that this type of magnetic amplifier exhibits specific properties, and it has been found that the desirable use of magnetic amplifiers in systems, such as a cathodic protection system, is made possible in accordance with the present invention. At this point it should be noted that the comparatively slow response time, which results in the rejection of second-harmonic magnetic amplifiers for numerous purposes, has not been found objectionable in cathodic protection systems.

Furthermore, and as one of the fundamental aspects of the present invention, the second-harmonic magnetic amplifier, when used as disclosed herein, has been found a suitable component for developing an output signal which is a function of both the polarity and the magnitude of the input signal. This type of device exhibits, furthermore, a high amplification factor and, as a further important feature, there is a possibility to maintain the drift of the output at a low level and within stability limits acceptable for the purpose of cathodic protection.

The stability of the first stage second-harmonic magnetic amplifier is determined by the relationship between the amplified output signal, on one side, and the average deviation from the ideal output, conventionally termed "drift," with no signal change in the control windings. The foregoing will be more clearly understood in connection with the description of FIGURE 3. At this point it should be stated that the sensitivity of the amplifier is a function of the degree to which the cores 30 and 32 are matched. It will be obvious that even when forming them from the same material to have identical shape, the degree of matching by mechanical means is limited. It is known that the matching properties of the cores of second-harmonic magnetic amplifiers may be improved by providing a resistor across either one or both power input windings 34 and 36, and adjusting the resistor until an optimum is obtained. Such an arrangement is shown in FIGURE 2 and the resistor is designated by numeral 48. By adjusting the sliding contact 50 of the adjustable resistor 48, a lack in matching properties may be compensated for to such an extent that the quiescent value of the output is brought to a value acceptable for the purpose of cathodic protection systems and most other amplifying systems.

As a result of the arrangement of the windings in circuit opposition, and when no current flows through the control windings 34, 36, no substantial current appears in the output circuit. If the cores 30 and 32 are exactly matched the output current is zero, regardless of the input power level applied to the terminals 42, since any electromotive force in the winding 38 associated with core 30 is exactly opposed by an equal electromotive force in the winding 40 of the core 32. While, theoretically speaking, with no signal current in the control windings and under ideal matching conditions no current at all would flow in the output windings, this is not so in practice. Small deviations from the ideal matching condition always exist and produce small currents in the output referred to as "quiescent" in accordance with generally accepted terminology. As described above, a resistor across only one of the windings 44 and 46, or the resistor arrangement shown in FIGURE 2, may be used for compensating and thereby reducing this quiescent output.

Upon the appearance of a differential signal current in the windings 34 and 36, asymmetry is introduced into the system inasmuch as each cycle includes one period during which only one of the cores 30 and 32 is saturated, while the other core is not saturated. During another period of each cycle, conditions are reversed and the other core is saturated while the first one is unsaturated. It will be described in more detail in conjunction with FIGURE 3 how this asymmetry occurs and leads to the foregoing result. At the present time, it might be sufficient to state that, for each input power cycle, two current impulses appear in the output circuit, provided that a signal current is applied to the control windings. Furthermore, it should be noted that the output impulses exhibit either of the polarities as a function of the polarity of the signal current. This means that, when a signal current of one direction results in output impulses of a polarity which may be termed positive, a signal current of the opposite polarity leads to a negative output current.

The differential signal developed in the signal circuit is adjusted in such a way that its polarity and magnitude indicate the degree of overprotection or underprotection. In the case of underprotection, more protective current is required, while, in the event of overprotection, current to the anode is reduced until the naturally occurring polarization phenomena on the hull restore balance of the system.

In accordance with the foregoing, the output circuit including coils 38 and 40 comprises a rectifier 52 connected in such a way that no current flows, even under unbalanced conditions of the cores 30 and 32, when the differential signal indicates overprotection. It can be seen that the specific properties of the second-harmonic magnetic amplifier permit controlling an output current as a function of the polarity of the differential signal, as well as of the magnitude thereof. Tests were run with regular magnetic amplifiers in an arrangement which, then, necessarily required eliminating one polarity from the input signal. However, the results obtained were not satisfactory because a rectifier in the sensing circuit distorted the signal to an extent which rendered the system useless for practical purposes. It can be seen from FIGURE 2 that the rectifier 52 suppresses one polarity from the output current so that no distortion or unnecessary losses may occur in the sensing circuit.

It will be seen from the foregoing that, with a differential signal indicating a need for protective current, current pulses are induced in the output winding 38 and 40, with a frequency which is twice the frequency of the power input applied to the coils 44 and 46 through terminals 42. This known performance feature of the device has lead to the term "second-harmonic magnetic amplifier." With each of the pulses, a capacitor 54 is charged and subsequently discharges through the control windings 56 and 58 of the conventional magnetic amplifier MA2.

The remaining output and control components include the conventional magnetic amplifier MA2 having bias windings 60 and 62 and output windings 64 and 66. Performing in a conventional manner, the output windings 64 and 66 drive the cores 68 and 70 of MA2 to saturation when energized through terminals 72. The bias coils 60 and 62 operate such as to obtain no output from MA2 when only a small, but constant input into the control windings 66 and 68 is present. This input corresponds to the quiescent level resulting from imperfect matching conditions in cores 30 and 32, as described above. Compensation by the bias coils 60 and 62 is adjusted in such a manner that, with only the quiescent level current flowing through windings 56 and 58, cores 68 and 70 are maintained at a level close to saturation. Consequently, the amplifier MA2 delivers no output when there is no current at the input of MA1 and a maximum output in the case of underprotection, i.e., when the flow of the current in the input circuit indicates a requirement for more protective current.

The output from amplifier MA2 is rectified by means of four diodes connected in a bridge circuit 74 and supplied to the control windings 76 of the saturable reactor 24. Control of the output current drawn from power supply 12 to the anode 28 is effected in the gate windings 78 of the saturable reactor 24. The adjusted power is then applied through transformer 80 and a full-wave rectifier 28 to the anode or anodes 26 and to the hull 8.

In order to demonstrate performance of the second-harmonic magnetic amplifier, as described above, the relationship of the wave forms of electromotive forces is assumed to be as illustrated in FIGURE 3. In the graph (a), a full line represents one entire cycle of voltage induced in one of the coils 38 or 40. Within the other coil, a corresponding but reversed electromotive force is induced, as shown by the full line in graph (b). It will be evident that this inversion is a result of the fact that the windings are arranged in phase opposition with respect to each other. Theoretically, the resulting current should be zero through the entire cycle. However, and since perfect matching conditions can not be obtained in practice, a weak current, will appear in the output circuit, as indicated by a dashed line representing the quiescent level in graph (c) of FIGURE 3.

In the foregoing paragraph it was assumed that no signal current flows through the control windings 34 and 36. Upon appearance of a signal current, the vertical portion of the full lines representing the electromotive forces are shifted in the direction of the arrows and into an assumed position indicated by dotted lines, the sense of direction of the arrows being a function of the polarity of the input signal. It can readily be seen that, by superimposition of electromotive forces according to (a) and (b), and when shifted into the positions indicated by dotted lines, voltage pulses result, as illustrated by the rectangular, cross-hatched areas in graph (c) of FIGURE 3. The actually obtained output voltage has the shape of a curve enveloping the rectangular areas as shown in graph (c) of FIGURE 3. It will be understood from the foregoing and it can be seen from graphs (a) and (b) that, when the direction of the arrows is inversed, the voltage pulses and, therefore, the current curve shown in graph (c) will appear on the negative side of the time axis, i.e., in the second quadrant of the system. These voltage pulses, as the result of a signal corresponding to overprotection, are suppressed by rectifier 52 and, therefore, lead to no substantial output current to the anodes, with the exception of the comparatively small output due to unbalance (mismatching) appearing continuously as the quiescent level.

FIGURE 4 is a graphical illustration of the operating characteristic 84 of the cathodic protection system described in the foregoing. In this graph, the differential signal voltage is entered as the abscissa and plotted against the anode current output in percent of total available output. It can be seen that the center of the graph, marked zero, corresponds to balancing conditions at which the potentials at point 20 of FIGURES 1 and 2, impressed by the reference half-cell and by the opposing voltage source 10, cancel each other, resulting in a zero magnitude of the differential signal voltage. At this condition, the anode current output is about 4 percent of the total available output, constituting the quiescent power level. The right-hand side of the abscissa, arbitrarily designated by a plus sign, corresponds to differential signal voltages obtained in the sensing circuit when the potential impressed by the opposing voltage source 10 prevails over that developed by the reference half-cell. It is assumed that, under given circumstances such as a certain composition of the water in the case of ship hull protection, the speed of the ship, and so forth, optimum cathodic protection conditions are maintained with an anode current output of about 20 percent. Such output is the result of a differential signal voltage of 0.001 volt, having the polarity corresponding to the right-hand side of the abscissa. The conditions so described are represented in FIGURE 4 by the operaitng point 86. With changing optimum conditions, point 86 moves along the characteristic 84 and it will be noted that, under normal operating conditions, the differential signal voltage remains in the range of the polarity corresponding to the right-hand side of the abscissa in FIGURE 4, as stated above, so that current flows in the sensing circuit only from the opposing voltage source 10 toward the reference half-cell, whereby the life of the cell is increased. It can be seen that, with the exception of the very small differential signal voltage range from 0 to 0.001 volt, the polarity of the signal represented by the right-hand side of the abscissa, designated by the arrow 88, corresponds to conditions termed "underprotection" in the foregoing.

With the same exception of the small range, overprotection conditions are associated with the differential signal voltage polarity corresponding to the left-hand side of the abscissa, arbitrarily designated by a minus sign. In other words, the remaining positive range from 0.001 volt to 0 and the entire negative, left-hand range of differential signal voltages corresponds to overprotection conditions, as indicated by the arrow 90.

It has been stated in the foregoing that, under normal operating conditions, operating point 86 corresponding to optimum conditions remains in the range of the differential signal voltage designated by a positive polarity in FIGURE 4. However, under extreme conditions of overprotection, such as that prevailing when the cathodic protection system of this invention is started to operate in connection with a protected hull, very little protective current is needed, so that operating point 86 may be shifted into the negative range of differential signal voltages. The characteristic of the system includes an uprising branch 92, FIGURE 4, which fact represent the danger of increasing protective current with increasing overprotection conditions resulting in what could properly be termed "running away" of the system. It is for this reason that the sensing circuit preferably includes the shunting diode or rectifier 21 having a conductive range indicated by the arrow 94 starting from the cut-off point 96 located at 0.05 volt, toward the more negative range of differential signal voltages. It can be seen from FIGURES 1 and 2 that rectifier or diode 21 permits the passage of currents flowing from the half-cell within the range indicated by the arrow 94 in FIGURE 4. Consequently, with signals ranging beyond the cut-off point 96, no current exceeding the minimum corresponding to that associated with point 96 can be supplied to the control windings 34 and 36 of the second harmonic amplifier MA1, and the dotted portion 92 of the characteristic in FIGURE 4 is made inoperative. As a result, the possibility of applying protective current under extreme overprotection conditions, and of the system "running away" along this portion of the characteristic in extreme cases, is avoided.

In practice, a cathodic protection system based on the arrangement described in the foregoing and useful for the protection of hulls of large sea-going vessels, generally, has an output to the anodes of as much as 30,000 watts. It will be appreciated that controlling such a comparatievly large power output as a function of a very weak input signal in the order of $10^{-9}$ watts represents an accomplishment which has been made possible by the use of the highly sensitive second-harmonic magnetic amplifier. It should be mentioned that the arrows indicating the shift in graph (a) and graph (b) of FIGURE 3, point in opposite directions, so that the resulting voltage pulses shown in graph (c) have twice the width of each the shifting occurring (a) and (b); the high power gain of the device is partly due to this fact. It has been stated in the foregoing that conventional magnetic amplifiers exhibit properties which do not permit controlling the power output of a system according to a signal below $10^{-5}$ watts. The sensitivity of the system may be characterized by the statement that the quiescent power level amounts to only about 4 percent of the total output. Accordingly, with 30,000 watts maximum power output, it has been established that only 1200 watts maximum are supplied to the anode in the absence of a signal current through the control windings 34 and 36.

It will be apparent that the system disclosed herein may readily be adapted for use in anodic protection. It is known that, at least with certain electrolytes, such as oleum, corrosion may be prevented by applying a positive potential to the surface to be protected, e.g., a steel tank containing oleum. Adaptation of the circuitry described in the foregoing is made by reversing the polarity of the output to the electrode or electrodes 26 termed "anodes" in the foregoing which then perform as cathodes. By a similar change of reversing the polarity of the opposed or bucking voltage 10 the system is adapted for and may be adjusted to operate as anodic protection equipment.

The system is described and illustrated herein by its principle, details known to one of ordinary art skill having been omitted. As stated above with respect to the bucking voltage 10 and the power input terminals 42 all current supplies including those to the terminals 72 and 84, the latter being associated with the bias coils 60 and 62 of the conventional magnetic amplifier MA2, are derived from the network available on board the ship. For the sake of simplification, all non-essential components have been omitted and only one reference cell and one anode are shown, while a plurality of each are used in practice. Generally, the power supply is a three-phase system and, accordingly, the saturable reactor may include three control windings and three gate windings.

It will be obvious to those skilled in the art that many more modifications may be made within the scope of the present invention without departing from the spirit thereof, and the invention includes all such modifications.

What is claimed is:

1. In combination, a cathodic protection power supply system with adjustable output for cathodically protecting a metal surface, a reference electrode mounted in spaced relationship with respect to said surface and constituting together with said surface a sensing means for developing a signal representing cathodic protection conditions having a power level of the order of $10^{-9}$ watts, a second-harmonic magnetic amplifier, means for applying the signal to the amplifier control windings, and means for adjusting the power output as a function of the amplifier output.

2. In a power control system for cathodically protecting a surface, a surface to be cathodically protected, means for supplying protective current to the surface, a reference electrode mounted in spaced relationship with respect to said surface and constituting together with said surface a sensing means for developing a signal voltage representing cathodic protection conditions on the surface, a second-harmonic magnetic amplifier, means for applying the signal voltage to the control windings of the amplifier, and means for varying the protective current supplied to the surface as a function of the output from the second-harmonic magnetic amplifier.

3. In an automatically controlled electrical power supply system for cathodically protecting a surface, a surface to be cathodically protected, means for supplying protective current to the surface, a second-harmonic magnetic amplifier, a reference electrode mounted in spaced relationship with respect to said surface and constituting together with said surface a sensing means for developing a signal voltage representing cathodic protection conditions on the surface, a source of reference potential in circuit opposition to the signal voltage to produce a differential signal voltage, means for adjusting the reference potential to provide a predetermined differential signal indicative of optimum cathodic protection conditions, means for applying the differential signal voltage to the control windings of the second-harmonic magnetic amplifier, means for increasing the power supplied to the surface as a function of one of the current directions appearing in the output windings of the second-harmonic magnetic amplifier, and means for substantially suppressing the oppositely directed current to substantially reduce power supplied to the surface.

4. In combination, means for adjustably applying electrical power to a system to maintain predetermined optimum conditions in the system, sensing means responsive to deviations from optimum conditions for developing a signal indicative of the deviation, a source of reference voltage in circuit opposition with the signal, means for comparing the signal with the reference voltage for producing a differential signal having either polarity, a second-harmonic magnetic amplifier, means for applying the differential signal to the control windings of the second-harmonic magnetic amplifier, means for suppressing one of the polarities induced in the amplifier output windings as the result of one polarity of the differential signal, and means for adjusting the power supplied to the system as a function of the other output polarity.

5. In an automatically controlled power supply system for cathodically protecting a surface, a surface to be cathodically protected, means for supplying protective current to at least one anode and to the surface, a reference half-cell mounted in spaced relationship with respect to said surface and constituting together with said surface a sensing means for developing a signal voltage representing cathodic protection conditions on the surface, a source of reference potential in circuit opposition to the reference half-cell voltage to produce a differential signal, means for adjusting the reference potential to provide balancing conditions at predetermined cathodic protection conditions, a second-harmonic magnetic amplifier, means for applying the differential signal to the control windings of the second-harmonic magnetic amplifier, means for adjusting the power supplied to the surface as a function of the current magnitude of one polarity appearing in the output windings of the second-harmonic magnetic amplifier, and means for substantially suppressing the amplifier output current of the other polarity.

6. In an automatically controlled power supply system for cathodically protecting the hull of a ship, at least one anode mounte din spaced relationship with respect to the hull, a power supply for providing protective current between the anode and the hull, a reference half-cell mounted in spaced relationship with respect to said hull and constituting with said hull a sensing means for developing a signal voltage, a source of reference potential in circuit opposition to the reference half-cell voltage to produce a differential signal indicative of cathodic protection conditions, a second-harmonic magnetic amplifier, means for applying the differential signal to the control windings of the second-harmonic magnetic amplifier, means for adjusting the power supplied to the hull as a function of the current magnitude of one polarity appearing in the output winding of the second-harmonic magnetic amplifier, and means for substantially suppressing the amplifier output current of the other polarity.

7. In an automatically controlled power supply system for cathodically protecting the hull of a ship, at least one anode mounted in spaced relationship with respect to the hull, a power supply for providing protective current between the anode and the hull, a reference half-cell mounted in spaced relationship with respect to said hull and constituting together with said hull a sensing means for developing a signal voltage, a source of reference potential in circuit opposition to the reference half-cell to produce a differential signal indicative of cathodic protection conditions, a second-harmonic magnetic amplifier, means for applying the differential signal to the control windings of the second-harmonic magnetic amplifier, rectifying means in the output circuit of the second-harmonic magnetic amplifier for suppressing the output polarity corresponding to differential signals indicative of excessive protective current, a conventional magnetic amplifier, means for applying the other second-harmonic magnetic amplifier output polarity to the control windings of the conventional magnetic amplifier to increase the output thereof, a saturable reactor for adjusting the power supply to the hull and the anode, means for applying the output from the conventional magnetic amplifier to the control windings of the saturable reactor, means for rectifying the saturable reactor output, and means for applying the rectified output to the anode and to the hull.

8. In an automatically controlled system for cathodically protecting a ship's hull, at least one anode to be mounted on the hull, and means for supplying a protective current between the hull and the anode; the system including a reference half-cell for generating a voltage indicative of cathodic protecting conditions on the hull, a source of reference voltage in circuit opposition to the reference half-cell for comparing the voltage generated by the reference half-cell to generate a differential signal voltage; the system further including a second-harmonic magnetic amplifier having matched cores, control windings arranged in circuit opposition, power input windings and output windings, the output windings being also arranged in circuit opposition whereby voltages induced in the output windings cancel each other when the input windings are energized and in the absence of current in the control windings; means for applying the differential signal voltage to the control windings of the second-harmonic magnetic amplifier, whereby differential current appears in the output windings upon unbalancing of the magnetic properties of the matched cores, rectifier means for suppressing the differential currents in the output windings resulting from one polarity of the differential signal voltage, means for amplifying the differential currents appearing in the second-harmonic magnetic amplifier output windings resulting from the other polarity of signal voltage; and means for controlling the protective power output level to the hull and to the anode as a function of the amplified differential current output of the second-harmonic magnetic amplifier.

9. In an automatically controlled system for cathodically protecting a ship's hull, at least one anode to be mounted on the hull and means for supplying a protective current between the hull and the anode; the system including a second-harmonic magnetic amplifier and a sensing circuit; the sensing circuit comprising a reference half-cell mounted in spaced relationship with respect to said hull and constituting together with said hull a means for generating a voltage indicative of cathodic protection conditions on the hull, a source of reference voltage in circuit opposition to the reference half-cell for comparing the voltage generated by the reference half-cell to generate a differential signal voltage, the control windings of the second-harmonic magnetic amplifier being arranged in circuit opposition, and an inductance to increase gain and to prevent second-harmonic currents from flowing through the reference half-cell; the second-harmonic magnetic amplifier having matched cores, power input windings and output windings, the output windings being also arranged in circuit opposition whereby voltages induced in the output windings cancel each other when the input windings are energized and in the absence of current in the control windings; the system also including means for applying the differential signal voltage to the control windings of the second-harmonic magnetic amplifier, whereby differential currents appear in the output windings upon unbalancing of the magnetic properties of the matched cores, rectifier means for suppressing the differential current in the output windings resulting from one of the polarities of signal voltage, means for amplifying the differential current appearing in the second-harmonic magnetic amplifier output windings resulting from the other polarity of signal voltage; and means for controlling the protective power output level to the hull and to the anode as a function of the amplified differential current output of the second-harmonic magnetic amplifier.

10. In an automatically controlled system for cathodically protecting a ship's hull, at least one anode to be mounted on the hull and means for supplying a protective current between the hull and the anode; the system including a second-harmonic magnetic amplifier having matched cores, power input windings and output windings, and a sensing circuit; the sensing circuit comprising a reference half-cell mounted in spaced relationship with respect to said hull and constituting together with said hull a sensing means for generating a voltage indicative of cathodic protection conditions on the hull, a source of reference voltage in circuit opposition to the reference half-cell for comparing the voltage generated by the reference half-cell to generate a differential signal voltage, the control windings of the second-harmonic magnetic amplifier being arranged in circuit opposition, an inductance to increase gain and to prevent second-harmonic currents from flowing through the reference half-cell, and including means compensating for unbalanced matching conditions in the cores, said means comprising at least one adjustable resistor connected across one of the power input windings; the output windings of the second-harmonic magnetic amplifier being also arranged in circuit opposition whereby voltages induced in the output windings cancel each other when the input windings are energized and in the absence of current in the control windings; the system also including means for applying the differential signal voltage to the control windings of the second-harmonic magnetic amplifier, whereby differential currents appear in the output windings upon unbalancing of the matched cores, rectifier means for suppressing the differential current in the output windings resulting from one of the polarities of the signal voltage, means for amplifying the differential currents appearing in the second-harmonic magnetic amplifier output windings resulting from the other polarity of the signal voltage; and means for controlling the protective power output level to the hull and to the anode as a function of the amplified differential current output of the second-harmonic magnetic amplifier.

11. In a automatically controlled system for cathodically protecting a ship's hull, at least one anode to be mounted on the hull and means for supplying protective current between the hull and the anode; the system including a second-harmonic magnetic amplifier and a sensing circuit; the sensing circuit comprising a reference half-cell mounted in spaced relationship with respect to said hull and constituting together with said hull a sensing means for generating a voltage indicative of cathodic protection conditions on the hull, a source of reference voltage in circuit opposition to the reference half-cell for comparing the voltage generated by the reference half-cell to generate a differential signal voltage, the control windings of the second-harmonic magnetic amplifier being arranged in circuit opposition, and an inductance to increase gain and to prevent second-harmonic currents from flowing through the reference half-cell; the second-harmonic magnetic amplifier having matched cores, power input windings and output windings, means compensating for unbalanced matching conditions to the cores, said compensating means comprising at least one adjustable resistor connected across one of the power input windings; the output windings being also arranged in circuit opposition whereby voltages induced in the output windings cancel each other when the input windings are energized and in the absence of control current; the system also including means for applying the differential signal voltages to the control windings of the second-harmonic magnetic amplifier, whereby differential current impulses appear in the output windings upon unbalancing of the matched cores, rectifier means in the output circuit of the second-harmonic magnetic amplifier for suppressing the output polarity corresponding to differential signals indicative of excessive protective current, a convential magnetic amplifier, means for applying the other second-harmonic magnetic amplifier output polarity to the control windings of the conventional magnetic amplifier to increase the output thereof, a saturable reactor for adjusting the power supply to the hull and the anode, means for applying the output from the conventional magnetic amplifier to the control windings of the saturable reactor, means for transforming the output from the saturable reactor to a voltage level suitable to the system, means for rectifying the transformed reactor output, and means for applying the rectified output to the anode and to the hull.

References Cited in the file of this patent

UNITED STATES PATENTS

| | | |
|---|---|---|
| 2,963,413 | Sabins | Dec. 9, 1960 |
| 2,966,625 | Kelley | Dec. 27, 1960 |
| 2,982,714 | Sabins | May 2, 1961 |

FOREIGN PATENTS

| | | |
|---|---|---|
| 602,848 | Canada | Aug. 2, 1960 |